Nov. 21, 1967 W. S. EVERETT 3,353,496

COMBINED FLUID PUMP AND PULSATION DAMPENER

Filed Jan. 19, 1967

INVENTOR.
WILHELM S. EVERETT

BY *Elliott & Pastoriza*
ATTORNEYS

United States Patent Office 3,353,496
Patented Nov. 21, 1967

3,353,496
COMBINED FLUID PUMP AND
PULSATION DAMPENER
Wilhelm S. Everett, 126 W. Santa Barbara St.,
Santa Paula, Calif. 93060
Filed Jan. 19, 1967, Ser. No. 610,309
3 Claims. (Cl. 103—223)

ABSTRACT OF THE DISCLOSURE

This disclosure relates to a combination pump and pulsation dampener wherein a pulsation dampener is secured directly to the pump in a manner to constitute part of the pump body. This is preferably accomplished by shaping a first end of the pulsation dampener to correspond to the shape of the normal port head or port plate for the pump so that the pulsation dampener may simply be substituted for this plate. The structure may be designed to include two pulsation dampeners terminating in a coupling structure for mounting to the pump in such a manner that the pulsation dampeners will respectively communicate with both the inlet and outlet ports of the pump itself. The invention is restricted to liquid dampeners and pumps.

This is a continuation-in-part of my co-pending patent application Ser. No. 439,139, now abandoned, filed Mar. 12, 1965 and entitled, Combined Fluid Pump and Pulsation Dampener.

This invention generally relates to improvements in liquid pumps, and more particularly pertains to an improvement in a liquid pump wherein a liquid pulsation dampening unit is combined directly with the liquid pump to filter out pulsations in the liquid. The invention has particular utility and advantages in conjunction with high speed, high frequency type pumps. Thus, the invention may be usefully employed with hydraulic pumps designed for aircraft power units, hydrostatic drives for marine use, and the like.

Certain types of pumps not only cause instrument meter damage, line shock and noise as a result of the pump pulsations, but also tend to damage certain internal components as a result of the vibration emanating from the pump pulsations. Thus, the multi-piston type wobble plate or swash plate type pump, for example, may be particularly damaging in this regard. With this type of pump, the compensating pistons, the regulator valves, and the like are vibrated to such an extent as to require frequent replacement because of the high magnitude of the pressure pulsations. In this regard, it is to be noted, the discharge pressure is usually pulsating at as much as 700 pounds, that is, plus or minus 300 pounds for a 3000 pound system.

Other types of pumps, for example, in which similar problems may be encountered are radial piston type pumps that may also be operating at high speeds and related high frequencies.

At the present time, all such pumps are either operated without any pulsation dampening equipment, or the pulsation dampening equipment—if employed—is located in the downstream line at some distance from the pump.

Certain disadvantages occur in having the pulsation dampener at a distance from the pump since, for example, a noisy line characterized by vibration will exist between the pump and the pulsation dampener or acoustic filter, as it is sometimes called. The situation is particularly aggravated in the case of liquid pumps and lines since the acoustic velocity in liquids is substantially greater than in gases wherein in the latter situations, short distances between a gas pump and gas pulsation dampener can be tolerated. In this respect, any distance of the pulsation dampener from the pump in the liquid case can result in a resonance factor proportional to the length of the line interposed, thereby causing noise levels which may be intolerable in the particular application to which the pump is applied. It is also evident that if a connecting line of even a shore length is used, a space must be allowed in the area in which the line is secured for purposes of accommodating the pulsation dampener unit.

It is, therefore, one of the objects of the present invention to provide an improved liquid pump or a combined liquid pump and liquid pulsation dampening unit in which the pulsation dampening unit is positioned immediately adjacent to the pump, to the end that the foregoing problems are overcome.

A related object of the present invention is to provide an improved liquid pump in combination with a pulsation dampening unit which materially decreases the possibility of amplification or other types of distortion of the pulsation waves of the pump.

A particular object of the present invention is to have the pulsation dampening unit or acoustic filter positioned adjacent to the pump so as to avoid standing waves in the liquid that could occur if the pulsation dampener were positioned at any appreciable distance from the pump.

A still further object of the present invention is to provide an improved liquid pump and combined liquid pulsation dampening unit wherein the pulsation dampening structure is combined with the pump in a novel co-functioning structural configuration to meet minimum space requirements and at the same time provide efficient and effective pulsation dampening.

These and other objects and advantages of the present invention are generally achieved by providing at least one liquid pulsation dampening unit having a modified end coupling structure for direct securement to the inlet or outlet port of the pump, for example, by replacing an end head or port plate of the pump with the pulsation dampening unit. A preferred construction for this purpose contemplates the provision of two pulsation dampeners in a V shaped structural configuration with the apex portion of the V constituting the coupling structure for connections to the inlet and outlet ports of the pump such that dampening is effected at both inlet and outlet pump openings.

For purposes of the present specification, the invention will be described from the standpoint of a multi-piston wobble plate type pump, although it will be appreciated that the invention has application to other types of liquid pumps, for example, the radial piston type pump, heretofore mentioned.

With these thoughts in mind, reference may be made to the drawings in which there is illustratively shown one embodiment of the improvement of the present invention, and in which.

Figure 1:
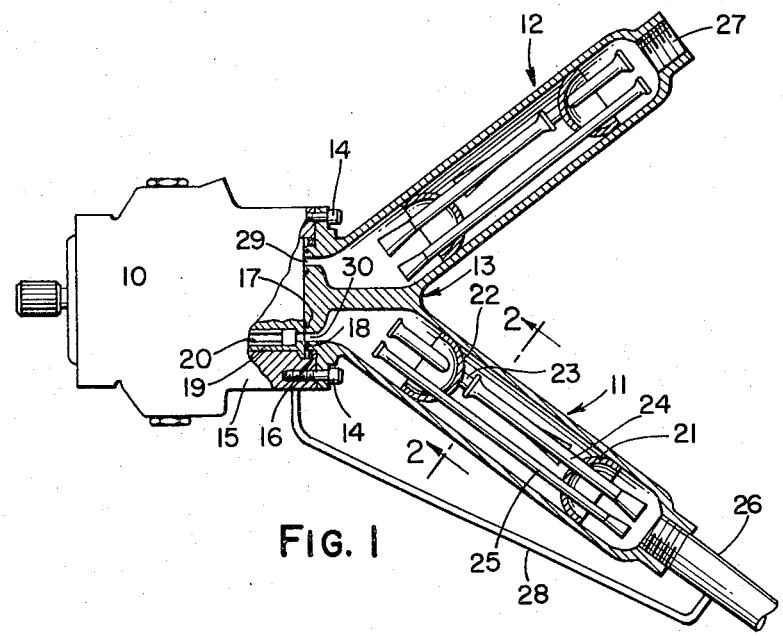
FIGURE 1 is a view of an improved liquid pump and pulsation dampening unit, partially in section.

Referring now to the drawings, there is shown in FIGURE 1, the improved pump and pulsation dampening structure of the present invention, including a pump 10 and pulsation dampeners 11 and 12. While two pulsation dampeners are shown, it is to be understood that only one is essential, such one being associated with either the inlet or outlet port of the pump. However, since improved results are realized by providing a dampening unit at both the inlet and outlet, this dual structure will be described.

The pump 10, for purposes of the illustrative example, comprises, as heretofore stated, a multi-piston wobble plate or swash plate type pump. In this type of pump, the constant pressure output is maintained by varying the angle of the wobble plate in response to a compensating piston. The angle of the wobble plate in turn varies the stroke of the pistons in the pump to increase or decrease the pressure as required.

In order to attenuate the pulsations of the pump 10, it is preferred that the pulsation dampeners 11 and 12 be applied, as shown, both to the suction and discharge of the pump. Because of the space requirements, the optimum configuration, when two units are employed, appears to be a novel integral V shaped casing 13 embodying both the pulsation damper 11 and th epulsation dampener 12. The apex of the V shaped casing 13 terminates in an end coupling structure 13a affixed to the pump 10 at one end thereof with mounting bolts 14, spaced circumferentially around the pump. In other words, the apex end 13a of the V shaped casing 13 is so shaped as to enable it to replace the end or port plate which would normally be affixed to the pump 10 with the mounting bolts 14. The V shaped casing 13 is thus secured directly to, and forms a part of, the pump body 15.

In order to avoid liquid leakage, O-ring seals or other equivalent seals may be provided at 16, 17, and 18.

In the view of FIGURE 1, the pump 10 is partially broken away to disclose certain conventional internal working parts. Thus, there is seen a cylinder barrel 19 which accommodates a compensating piston 20 which functions, as heretofore described, for the ultimate purpose of varying the pressure output of the pump.

The pulsation dampeners 11 and 12 may be internally of conventional construction.

Preferably, the pulsation dampeners are of the type described in Reissue Patent No. 24,390 dated Jan. 24, 1956, and Patent No. 2,993,559 issued July 25, 1961, to the applicant herein. In the alternative, for example, the pulsation dampeners could be of the type disclosed in the patent issued to Milton J. Ludwig, Patent No. 2,727,470, dated Dec. 20, 1955. In any event, the pulsation chambers are of the type in which at all times during the operation of the pump, the inlet and outlet portions and chambers are completely filled with liquid such as taught in the foregoing prior patents.

Assuming the pulsation dampeners 11 and 12 to be of the former construction, only the pulsation dampener 11 will be described, since the pulsation dampener 12 is substantially identical in construction.

Figure 2:
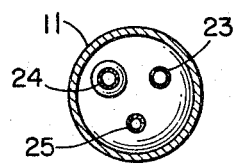
FIGURE 2 is a sectional view taken in the direction of the arrows 2—2 of FIGURE 1.

With reference to both FIGURES 1 and 2, the pulsation dampener 11 has disposed therein bulkheads or walls 21 and 22, respectively. A series tube 23 extends through the wall 22 into an intermediate chamber between the walls 21 and 22 to provide communication between a first end portion of the dampener and the intermediate chamber. Similarly, a series tube 24 extends through the wall 21 into the same chamber such that liquid passing through the tube 23 will flow into the chamber and out one end of the tube 23 and into the end of the tube 24 and thereafter out towards the second end portion of the pulsation dampener. The tubes 23 and 24 constitute passage means connecting the first and second end portions of the dampener with the intermediate chamber. Also disposed within the pulsation dampener 11 is a branch tube 25 or a "straight through" tube which bypasses the intermediate compartment. The operation of this type of pulsation dampener is clearly and adequately described in Patent No. 2,993,559 and Reissue Patent No. 24,390.

From the standpoint of the operation of the improved pulsation dampener and liquid pump of the present invention, it can be assumed that the pulsation dampener 11 is connected to a discharge line 26 and that an appropriate suction line is coupled to the end 27 of the pulsation dampener 12.

In order that a constant pressure may be maintained in the pump 10, a sensing line 28 interconnects the discharge line 26 with the cylinder barrel 19 accommodating the compensating piston 20. In this regard, although the sensing line 28 has been shown in the solid line as only connecting with the pump 10, it actually connects with the interior of the cylinder barrel 19, for example, as indicated by the dotted line through the pump body 15.

With this type of construction, liquid would be drawn in through the pulsation dampener 12 and thereafter through an inlet port 29 of the pump 10 to be pumped through the pump 10 and thereafter out through an outlet port 30 of the pump 10 into the pulsation dampener 11 and into the discharge line 26. According to the pressure in the discharge line, the sensing line 28 will vary the pressure on the compensating piston and in turn the angle of the wobble plate to correspondingly vary the stroke of the main piston to the pump.

It is evident that by providing the sensing line 28 to connect with the discharge line downstream of the pulsation dampener 11, only very slight pulsations will appear in the discharge line and in turn only a small vibration or chatter will occur insofar as the compensating piston, wobble plate, and related components are concerned.

Figure 3:
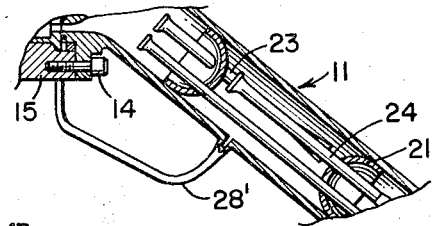
FIGURE 3 is a fragmentary view showing a modification of the structure of FIGURE 1; and, FIGURE 4 is a sectional view of a modified construction for the pulsation dampening unit shown in FIGURE 1.

In the alternative, and as shown in FIGURE 3, it may be preferable to connect the sensing line directly to the intermediate chamber of the pulsation dampener 11, such as indicated at 28'. In this way, pulsations directly in the surge chamber of the dampener will be transmitted to the various internal components of the pump 10 to effect compensation.

As a result of the construction described, wherein the pump 10 has coupled adjacent thereto the pulsation dampening units 11 and 12, the pump transmits appreciably less line shocks, has its own components subject to much less maintenance, is quieter in operation, and occupies a smaller space. Although it is preferable to use the V shaped configuration shown, it is conceivable that the pulsation dampeners could be arranged in a parallel configuration assuming space requirements were sufficient. It is also, of course, possible to use only the pulsation dampener on the inlet port 29 or the outlet port 30 as mentioned theretofore.

Figure 4:
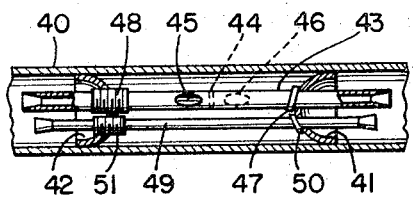

Referring now to FIGURE 4, a modification is shown in which the pulsation dampener may be assembled by inserting the tubes from one end of the unit instead of having an integral welded structure.

Thus, there is shown in FIGURE 4 a pulsation dampener 40 similar or equivalent to the pulsation dampener 11 and provided therein with conventional bulkheads 41 and 42.

In this instance, instead of using passage means in the form of the series tubes 23 and 24 (as in FIGURE 1), a single tube 43 is employed which is provided with a plug 44 in the center thereof. Appropriately sized openings 45 and 46 are provided on either side of the plug 44 so that fluid passing through the tube 43 and through the bulkhead 42 will first pass out of the opening 45 into the intermediate compartment and thereafter into the opening 46 back into the tube 43 and through the bulkhead 41. By using this type of structure, the tube 43 may be inserted through the bulkhead 42 until a stop ring 47 affixed to the tube 43 contacts the bulkhead 41. Thereafter, a threaded sleeve 48 on the tube 43 may be threaded into the bulkhead 42.

A similar construction may be used for the branch tube 49 shown in the pulsation dampener 40 by providing a stop ring 50 and a threaded sleeve 51. With this type of construction, it is therefore feasible to assemble the tubes from one end of the pulsation dampener 40 without having access to the other end or the interior compartment thereof. This type of construction, therefore, would have certain advantages with radial type pumps for maintenance and initial assembly purposes. It will be appreciated, again, as heretofore mentioned, that other types of internal construction may be used for the pulsation dampeners forming a part of the combination of the present invention.

It will further be appreciated that minor modifications and changes may be made to the illustrative structures shown by way of example, without departing from the spirit and scope of the invention as set forth in the following claims.

What is claimed is:

1. The combination comprising: a liquid pump of the high frequency, high speed type having inlet and outlet ports; and at least one liquid pulsation dampener having a first end portion shaped to be secured directly to said pump by the same bolts normally employed to secure the normal port plate of said pump so that said pulsation dampener constitutes a substitute for said port plate and thereby a part of the pump body in direct communication with at least one of said ports of said pump such that there is no appreciable length of liquid passage between said port and said pulsation dampener, said pulsation dampener having a second end portion adapted for connection to the liquid line for said pump normally connected to said one of said ports, said pulsation dampener including a chamber for liquid, and passage means connecting said first end portion and said second end portion with the chamber, said first and second end portions and chamber being at all times completely filled with liquid when said pump is operating whereby liquid pulsations passing into said pulsation dampener when said pump is operating are dampened.

2. The combination comprising: a high speed, high frequency pump having at one end thereof liquid inlet and outlet ports; a pair of integral pulsation dampeners affixed to said one end of said pump, one of said pulsation dampeners communicating with the inlet port of the pump interposed in series with the line leading thereto and the other of said pulsation dampeners communicating with the outlet port of said pump interposed in series with the line connected thereto, said pump being of the wobble plate type and including a compensating piston and chamber therefor, and in which said pair of pulsation dampeners are mounted in a "V" shaped integral configuration on said one end of said pump.

3. The combination of claim 2, including a line interconnected between the interior of said pulsation dampener and the compensating piston chamber of said wobble plate type pump such that the compensating piston chamber will sense the change of pressure within said pulsation dampener.

References Cited
UNITED STATES PATENTS

| | | | |
|---|---|---|---|
| 1,882,928 | 10/1932 | Rockwell | 103—224 |
| 2,368,132 | 1/1945 | French | 103—150 |
| 2,548,472 | 4/1951 | Gibson | 230—236 |
| 2,620,125 | 12/1952 | Kilchenmann | 230—172 |
| 3,094,078 | 6/1963 | Brueder | 103—162 |
| 3,096,721 | 7/1963 | White et al. | 103—150 |
| 3,255,779 | 6/1966 | Russell | 103—223 X |

ROBERT M. WALKER, *Primary Examiner.*